Aug. 13, 1957  A. J. FLYE, SR  2,802,293
HOOK PROTECTOR
Filed Aug. 8, 1955
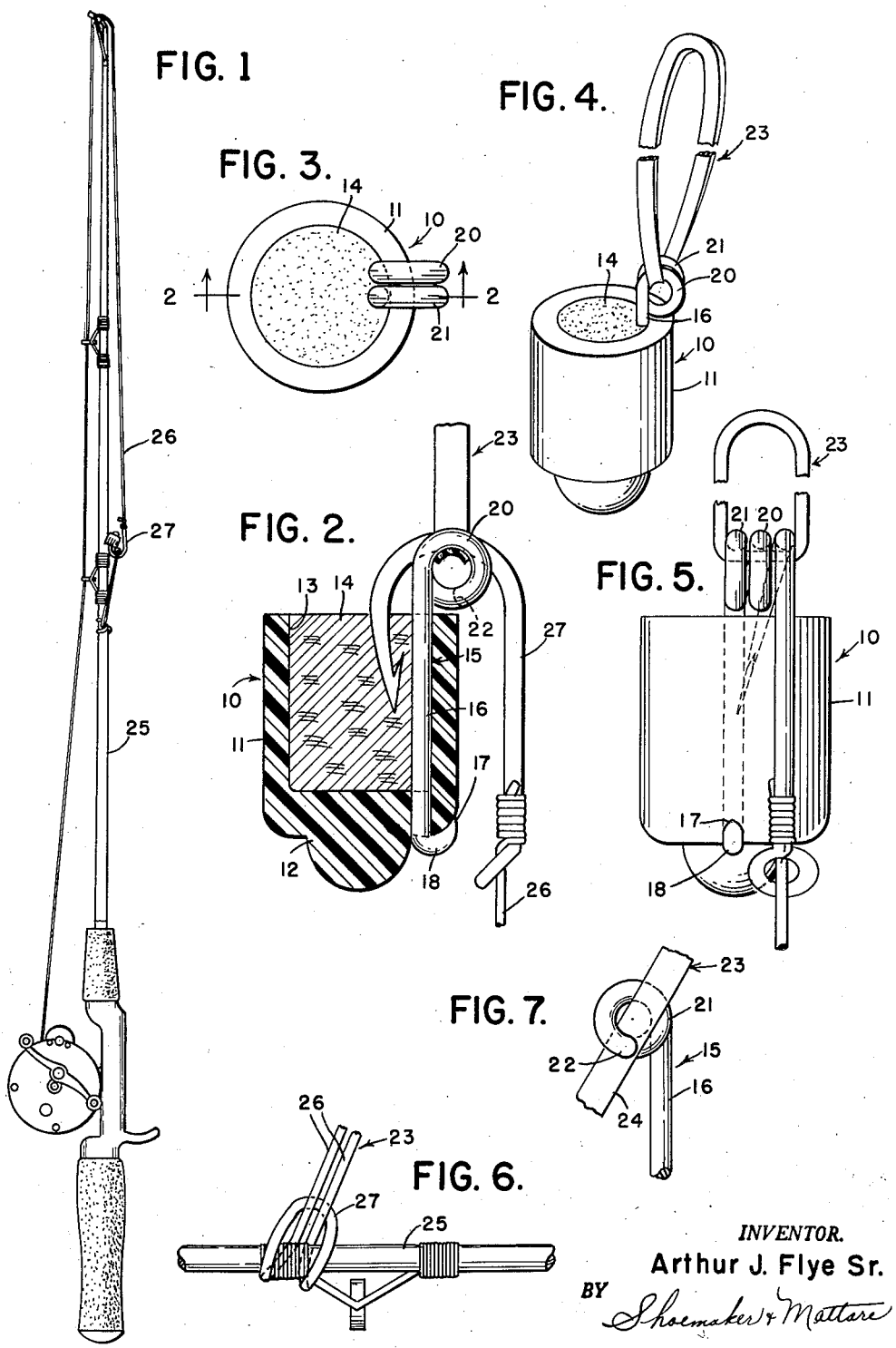
INVENTOR.
Arthur J. Flye Sr.
BY Shoemaker + Mattare
ATTORNEYS

United States Patent Office 2,802,293
Patented Aug. 13, 1957

2,802,293

HOOK PROTECTOR

Arthur J. Flye, Sr., Washington, D. C.

Application August 8, 1955, Serial No. 526,804

6 Claims. (Cl. 43—25.2)

This invention relates to fishermen's accessories and pertains more particularly to protective means for a fishing hook.

When fishing tackle is not in use, it is well known that the hooks if left lying around can present a considerable hazard and it is not infrequent that a fisherman injures himself with a fish hook. As a result, it is common practice to remove the fish hooks from the tackle and store the same but as is well known, this is a difficult task particularly after the tackle has been in the water for some time inasmuch as knots are difficult to remove.

It is, therefore, a primary object of this invention to provide a simple yet efficient means for protecting a fish hook from exposure without removing the same from its associated tackle.

Another object of this invention is to provide an improved protector means which embodies a member for receiving and obscuring the point of a fish hook and elastic means associated therewith readily attachable to a fishing pole so as to hold the device in engagement with the associated fish hook and which will also serve to maintain the fishing leader and line in taut relation while the same are drying, thus preventing the same from being kinked or knotted.

Another object of this invention is to provide an improved fish hook protector means which embodies a pliable cap or case having a recess therein receiving a plug of soft material such as cork or the like into which the fish hook may be embedded and means associated therewith to secure the body to a fishing pole or rod.

Still another object of this invention is to provide an improved fishing hook protector which incorporates a pliable or plastic body or cap having a recess therein within which a plug of cork or similar material is inserted for receiving the fish hook in embedded relation therein and wherein an anchor pin member is projected into the recess and through the body of the cap member and firmly affixed thereto, the anchor pin having a looped free end portion for receiving an elastic member for securing the device to a fishing rod.

Another object of this invention is to provide an improved fish hook protector in accordance with the preceding object wherein the looped free end of the anchor pin embodies several closely spaced coils so as to permit the ready engagement with a loop of elastic material therewith.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

In the drawings:

Fig. 1 is an elevational view showing a fishing rod and reel assembly and illustrating the manner in which the improved hook protector is utilized;

Fig. 2 is an enlarged sectional view showing the protector device when engaged with a hook;

Fig. 3 is a top plane view of the protective body;

Fig. 4 is a perspective view of the improved hook protecting device;

Fig. 5 is an elevational view showing the assembly as illustrated in Fig. 2;

Fig. 6 is an elevational view showing the manner in which the elastic loop or band is attached to the fishing pole; and Fig. 7 is an elevational view showing the manner in which the elastic band is applied to the anchor pin.

Referring now more particularly to the drawings, the reference numeral 10 indicates generally a plastic or pliable body or cap which includes a cylindrical side wall portion 11 and a closed bottom wall portion 12 presenting a recess 13 in the body opening upon one end thereof and into which a plug 14 of soft material, such as cork, is received. The plug snugly fits within the recess 13 of the body 10 and such snug fit may be the sole means for retaining the plug within the body, although it is, of course, to be understood that a suitable adhesive means may be utilized if desired to retain the plug within the body.

An anchor pin member generally designated by the reference character 15 is employed in conjunction with the body or cap 10 for the purpose of providing means by which the body may be anchored to a fishing rod or pole in the manner illustrated in Fig. 1. Such anchor pin embodies a straight shank portion 16 which is of sufficient length as to project axially completely through the body 10 in the manner shown and such shank terminates at its lower end in a pointed or sharp portion 17 which, when the anchor pin is engaged with the body in the manner shown in Fig. 2 serves to permit such anchor pin to be forcibly projected through the end wall 12 after which the end portion 18 of the anchor pin is bent over in the manner shown in Fig. 2 so as to prevent withdrawal of the anchor pin from the body 10. It is preferred that the anchor pin be inserted within the body in the particular manner shown in Fig. 2 wherein the shank 16 lies closely adjacent to or in contact with the inner surface of the side wall 11 and by this process, it will be seen that the anchor pin will serve to more firmly affix the plug 14 within the recess 13. That is, the anchor pin shank 16 will displace some of the soft material of the plug 14 and cause the plug to expand into more snug engagement with the inner surface of the side wall 11 of the body 10.

The upper end of the anchor pin is deformed to provide a series of coils or loops 20 and 21 with the outermost loop as seen in Fig. 7 terminating in the end portion 22 disposed in the lowermost region of the coils. As will be noted most particularly in Fig. 5, each of the coils is slightly spaced from the next adjacent coil so as to provide clearance therebetween, for a purpose which will be presently apparent.

Engaged through the coils 20 and 21 is an elastic loop or band 23 which serves as the means connectible with the fishing rod or pole to anchor the body 10 in place thereon. When it is desired to insert the band 23 through the loops of the anchor pin 15, a portion 24 of the band, as seen in Fig. 7, is inserted between the terminal end 22 and the body of the next adjacent coil 21 and the portion 24 of the elastic band is then twisted around as permitted by the clearance between the adjacent coils so that it ultimately assumes the position shown in Figs. 4 and 5. Thus, it can be seen that the insertion of another elastic band should the original one break is greatly simplified by the particular construction of the looped end portion of the anchor pin.

In attaching the protector to a fishing rod or pole 25, it will be readily appreciated that the elastic band 23 is looped around the rod 25 in the manner shown in Fig. 6 and the running ends 26 thereof which are engaged with the anchor pin are, together with the body 10 passed through the bight 27 in the manner shown. That portion of the elastic band which is engaged on the pole 25 is positioned along the length of the pole by finger manipulation to a point wherein the elastic band is put under tension when the fishing hook is embedded in the plug 14 in the manner shown in Figs. 1 and 2. Thus, by the tension imparted to the elastic band, the same will be more tightly engaged upon the fishing rod and such tension will be transferred to the leader or fishing line 26 to which the hook 27 is attached, thus maintaining the same in taut and straight relation while the same is drying and thereby preventing the line or leader from drying in a kinked or coiled position which would render its handling difficult for the next time the tackle is used.

Preferably, the hook is engaged with the elastic band 23 in the manner shown in Fig. 5, that is, the hook is engaged over the band and embedded to such an extent in the plug 14 that the band actually pulls against the hook rather than the coils 20 and 21, thus transferring the tension in the elastic band directly to the hook and to the line 26. This prevents the plug 14 from becoming unduly damaged by operating to transfer the tension from the band to the hook as would occur if the hook were not engaged with the band directly in the manner shown in Figs. 2 and 5.

The body 10 is preferably formed of plastic or resilient material since by utilizing such material the cap is not easily destroyed as might be occasioned were the same formed from some other brittle material or some metal which would be easily distorted. However, the cap can, of course, be formed of any suitable material.

The coils 20 and 21 of the anchor pin 15, it will be noted, are of sufficiently large internal diameter as to loosely receive the elastic band 23. This permits both sides of the band to be placed under equal tension when the device is applied to the fish hook and the fishing pole, in other words, the tension will be equalized between the two parallel flights 26 of the elastic band, thus materially enhancing the life of such band.

The band not only serves the purpose of attaching the body to the fishing rod and applying tension to the leader or line with which the fishing hook is associated but it also permits the protective device to be easily carried about without danger of being lost. That is, the band 23 can easily be slipped over a person's wrist and since the body 10 and plug 14 are of insignificant weight, they will cause no inconvenience or discomfort when the band is thus applied to a person's body.

It is to be noted that the protector not only prevents engagement of the fish hook with the user's body, but it also protects the fish hook from being dulled as, for example, would happen if the same were naked to permit engagement with any objects that might be near.

Still further, the protector cap serves a very useful purpose insofar as prolonging the life of a fish hook by reason of the fact that when the fish hook is embedded in the soft material 14, the formation of rust on the fish hook point will be a practical impossibility and the life of the hook will, therefore, be prolonged.

I claim:

1. A fish hook protective device comprising a body having at least a portion thereof formed of soft material adapted to have a fish hook point embedded therein, and an elastic band attached at a single point to said body for attachment to a fishing rod to maintain the point of an associated fish hook embedded within said portion of soft material, said band being of a length to permit said body to hang freely from an associated fishing rod when not in use.

2. A protective device for fishermen comprising a body member having a recess therein, a plug of soft material disposed within said recess for receiving the point of a fish hook in embedded relation therein, and means for attaching said body to a fishing pole, said means comprising an elastic band attached only at one end portion thereof to said body member so that when the other end is attached to an associated fishing pole, the body member is free to swivel with respect thereto.

3. A protective device for fishermen comprising a cup-like body member, a plug of soft material snugly received within said body member for receiving the point of a fish hook therein, an anchor member projecting through said body and having an end portion bent in hook-like fashion to prevent disengagement of the anchor member from said body, and means for attaching said anchor member to a fishing rod.

4. A protective device for covering the point of a fish hook and maintaining an associated leader in taut condition, which comprises a body having a portion thereof formed of soft material into which a fish hook point may be embedded, an anchor pin secured to said body and including a loop portion, and an endless elastic band loosely engaged through said loop portion for securing the body to an associated fishing rod.

5. A protective device for covering the point of a fish hook, comprising a body member having a cylindrical wall open at one end and having an end wall closing the other end, an anchor pin having a straight shank portion projecting into the open end of said body adjacent the inner surface of said side wall and through said end wall, said shank portion terminating at one end in a hook-like point exteriorly of said end wall and lying in close contact with the outer surface of said body to prevent withdrawal of the anchor pin from the body, said anchor pin terminating at its other end in a series of closely spaced coils, a plug of soft material snugly engaged within said body in close contact with the inner surface of said side wall, and means engaged through the coils of said anchor pin for securing the body to a fishing rod.

6. In the protective device according to claim 5 wherein said means comprises an endless elastic band.

References Cited in the file of this patent
UNITED STATES PATENTS 1,531,725    Baker _____ Mar. 31, 1925
1,662,983    Pflueger _____ Mar. 20, 1928